Figure 4:
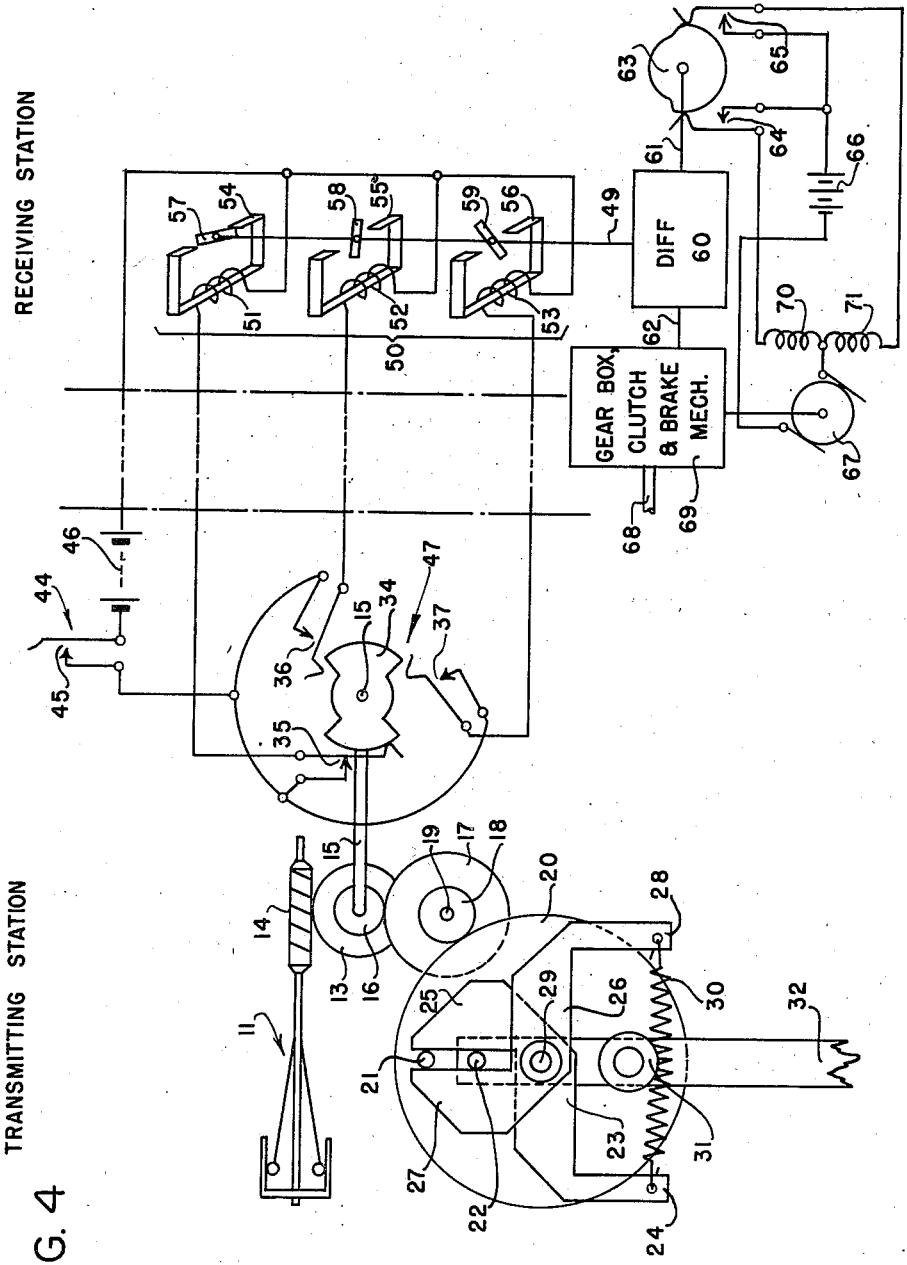

Sept. 16, 1947.  E. S. PETERSON  2,427,621
REMOTE CONTROL SYSTEM
Filed Sept. 11, 1943  2 Sheets-Sheet 1
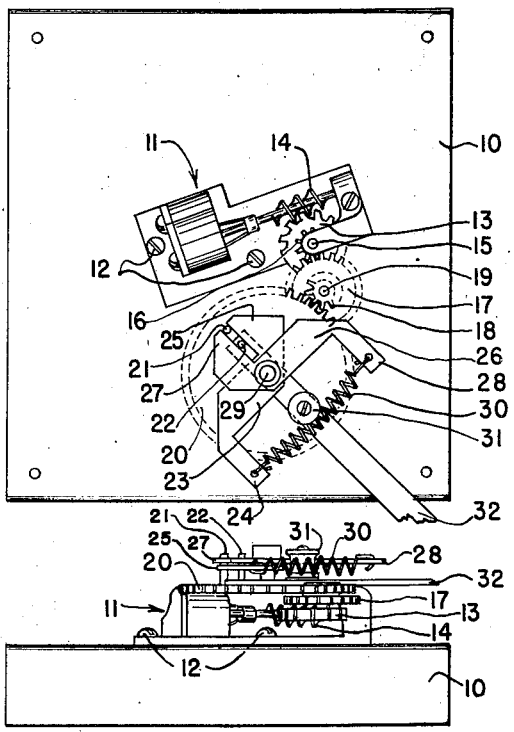
FIG. 1
FIG. 2
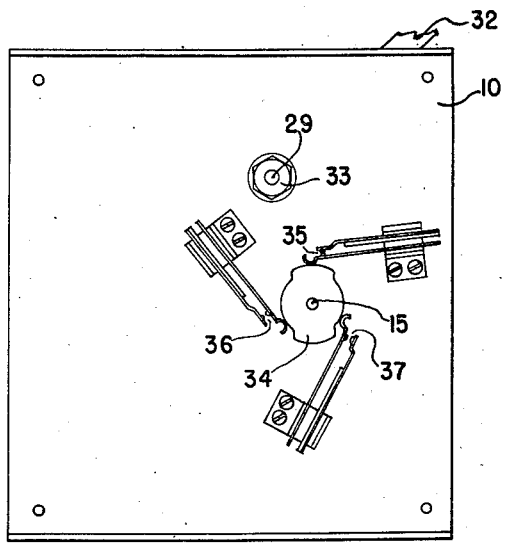
FIG. 3
INVENTOR.
EDWARD S. PETERSON
BY
Davis, Lindsey, Smith & Shonts
ATTORNEYS Patented Sept. 16, 1947

2,427,621

UNITED STATES PATENT OFFICE 2,427,621

REMOTE-CONTROL SYSTEM

Edward S. Peterson, Elmwood Park, Ill., assignor to Automatic Electric Laboratories, Inc., Chicago, Ill., a corporation of Delaware Application September 11, 1943, Serial No. 501,957

5 Claims. (Cl. 64—27)

This invention relates to a remote control or telemetric system for producing at a remote point an angular displacement of a member in either direction proportional to the angular displacement of a member at the control station.

Heretofore numerous telemetric or remote control systems have been provided for reproducing the angular displacement of a member in either direction at a remote point to correspond to the angular displacement of a member at a transmitting station, but such systems generally have involved the use of certain power sources which had to be maintained constant within a certain predetermined range. Other systems have involved the use of complicated bridge circuits requiring considerable apparatus in order to obtain a desired degree of accuracy. In many instances it would be highly desirable to provide a remote control or telemetric system for angular displacements which would utilize a simple circuit arrangement and which could be energized from a direct current source such as a storage battery or small generator.

It therefore is an object of the present invention to provide an improved telemetric system for reproducing angular displacement of a member in either direction.

Another object of the present invention is to provide a remote control system for producing at a remote point angular displacement of a member in either direction proportional to the angular displacement of a member at a control station.

Still another object of the present invention is to provide in a telemetric or remote control system a new and improved transmitter device utilizing mechanical energy storage means to follow the displacement of an angularly displaceable member.

Still another object of the present invention is to provide in a telemetric or remote control system a new and improved transmitting device utilizing a mechanical energy storage means between a rotatable member and an impulse transmitter which is controlled to transmit impulses at a rate of speed not greater than a predetermined value.

In accordance with the present invention these and further objects are obtained by a telemetric system which includes a transmitting station, a receiving station, and at least three transmitting channels between the stations. An improved transmitting unit is provided with a mechanical energy storage follow-up means which interconnects an angularly displaceable member with a transmitter arranged to transmit a series of impulses for each of the channels, the impulses of each series being displaced in time, relative to the impulses of the other series, and the impulses transmitted are transmitted at a rate not exceeding a predetermined value. Means are provided at the receiving station responsive to the impulses received to position a member in the direction and magnitude corresponding to the direction and magnitude of the angular displacement of the member at the transmitting station. Where such device is to control a proportional angular displacement of another member this is accomplished by a differential gear mechanism interconnecting a follow-up control switch and the device which is to receive a proportional angular displacement. The control switch controls the supply of energy to a reversible motor for producing the proportional angular displacement. Furthermore, in accordance with the present invention the channels interconnecting the stations may comprise wire, carrier current or radiant energy channels.

Other and further objects of this invention will become more readily apparent by reference to the following description taken in connection with the accompanying drawings, wherein Figs. 1, 2 and 3 are top, side and bottom views, respectively, of the improved transmitter utilized in the telemetric system schematically illustrated by the circuit diagram of Fig. 4.

Referring to Figs. 1, 2 and 3 of the drawings, there are shown the mechanical components of the transmitting unit which comprises a mounting base 10 having on the top side thereof a speed governor 11 secured to the base 10 by suitable screws 12. The governor 11 is provided with a worm gear 13 which engages a worm 14. The worm gear 13 is connected to a shaft 15 which is secured to a pinion gear 16. The pinion gear 16 meshes with a gear 17 which drives a pinion 18 which, in turn, engages a gear wheel 20. The gear wheel 20 is arranged to rotate freely upon a shaft 29 which is secured to the mounting base 10 by a nut 33. Along a radius of the gear 20 there is provided a pin 21. Also mounted on the shaft 29 is an angularly displaceable member shown as a lever 32 which, along a radius through its pivotal axis, is provided with a pin 22. The pins 21 and 22 normally are engaged by the arms 25 and 27 of a pair of crossed levers which, on the other side of the pivotal point, are provided with extension portions 23 and 26 connected respectively to the outer arms 24 and 28. The arms 24 and 28 are biased towards each other by a spring 30 which serves as a mechanical energy storage means whenever the angularly displaceable member 32 is angularly displaced at a rate exceeding the maximum rate of speed at which the gear 20 may be angularly displaced due to the action of the governor 11. The arm 32 is provided with a pulley 31 mounted adjacent to the spring 30, so that when the arm 32 is angularly displaced so as to cause a stretching of the spring 30, the spring will be held away from the pivotal axis which corresponds with the axis of the shaft 29.

If it is now assumed that the arm 32 is moved in a counterclockwise direction the pin 22 attached to the other end of this arm bearing against the lever arm 27 causes counterclockwise movement of the arm portion 28, thereby to stretch the spring 30 about the pulley 31. The spring 30 therefore pulls on the free end of the arm 24 so as to exert a force through the lever arm 25 against the pin 21 which is secured to the gear 20. This drives the gear 20 in a counterclockwise direction at a speed controlled by the governor 11 until the pin 21 again engages the lever 27. When both the pins 21 and 22 are engaged by both lever arms 25 and 27 there is no further movement of the gear 20.

The shaft 15 which supports the gears 13 and 16 extends through the mounting panel 10 to the other side where, as seen from Fig. 3, there is connected to this shaft a cam 34. The cam 34 has two high portions arranged so that one of the high portions at any time will engage one of three sets of contacts 35, 36 or 37 equally spaced angularly about the shaft 15. Since the gear 20 steps up the rotation of the gear 16 it is apparent that the shaft 15 turns a number of times for a small angular movement of the gear 20, whereby the switches 35 to 37 are each actuated a number of times.

The switches 35 to 37 are connected in a circuit shown in Fig. 4 so as to receive energy from a battery 46 through the switch 44. For the present consideration it may be assumed that the switches 35, 36 and 37 are each connected by separate conductors to the receiving station and that a common conductor is provided between the battery 46 and the receiving station. At the receiving station an angularly displaceable member 49 is arranged for rotation by an impulse receiving means 50 which comprises a plurality of coils 51, 52 and 53 arranged on individual magnetic pole structures 54, 55 and 56, respectively. The pole structures 54 to 56 cooperate with a plurality of armatures 57 to 59, each angularly displaced by equal amounts around a shaft or angularly displaceable member 49. Thus in the position of the cam 34 shown in the figure, the contacts 35 are closed so as to supply energy to the field coil 51, thereby to tend to align the armature 57 with the pole piece 54. As either of the switches 36 or 37 is next closed, dependent upon the direction of rotation of the cam 34, the other field coils in turn are energized so that the respective armatures tend to be aligned with the respective pole structures. The angularly displaceable member or shaft 49 is connected to a differential gear apparatus 60 which is connected by a shaft 61 to a cam 63 which controls reversing switches 64 and 65. These reversing switches are connected in a circuit which includes a source of direct current 66, a motor armature 67, and a pair of field coils 70 and 71. The motor armature 67 rotates in a direction dependent upon which one of the two field coils 70 or 71 is energized by the closure of switches 64 or 65. The shaft of the motor 67 is connected to a gearbox clutch and brake mechanism 69 to drive a shaft 68 through an angular displacement proportional to the angular displacement of the member 32 at the transmitting station. The differential gear assembly 60 is connected by a shaft 62 to the gear mechanism 69 so that when the shaft 68 has received a proportional angular displacement the differential 60 will operate to restore the shaft 61 to the position shown in the drawing, whereby the cam 63 is in a position to open both sets of contacts 64 and 65 thereby to deenergize the armature 67.

Each of the connections from the switches 35, 36 and 37 at the transmitting station to the field coils 51 to 53, respectively, at the receiving station constitute a channel over which current impulses are transmitted at a rate not exceeding a maximum allowable speed as controlled by the governor 11. While for the purposes of initially explaining the operation of the transmitting station and the receiving station it was convenient to assume that these stations were interconnected by wire circuits, it of course will be readily appreciated that these various channels might comprise carrier current or radiant energy channels. In such cases the direct current impulses generated by the transmitter 47 would be converted into corresponding higher frequency current impulses for carrier current or radiant energy wave transmission to the receiving station, where these impulses again would be reconverted into direct current impulses to energize the motor 50. From this it becomes apparent that there has been provided a telemetric or remote control system which utilizes relatively simple components and which is not dependent upon a difficult-to-maintain source of energy, nor is the control limited by the use of wires or other physical limitations which otherwise would detract from the versatility of application of the system to various purposes and uses.

While one embodiment of the invention has been disclosed, it will be understood that various modifications may be made therein which are within the true spirit and scope of the invention.

What is claimed is:

1. A rotatable member subject to angular displacement, a rotatable follower member adapted to move through a corresponding angular displacement at a substantially uniform rate of speed, and mechanical energy storage means including a pair of crossed levers normally biased toward each other by a single spring interconnecting the free ends of said levers and connected between said members to cause said follower member to follow the displacement of said first member.

2. A pivoted member subject to angular displacement, a pivoted follower member adapted to move through a corresponding angular displacement at a substantially uniform rate of speed, and a pair of crossed levers biased toward each other by a spring interconnecting the free ends thereof and having the opposite ends thereof cooperating with said members to cause said follower member to follow the displacement of said first member.

3. The combination comprising a pivoted member subject to angular displacement, said member being provided along a radius passing through its pivotal axis with a pin, a pivoted follower member having an axis common to the axis of said first member and being provided along a radius passing through said axis with a pin, a pair of crossed levers having pivotal axes common to the aforementioned axis, adjacent arms of said levers normally being in engagement with said pins, and spring means connected between the other arms of said levers to urge said first mentioned arms into engagement with said pins.

4. The combination comprising a rotatable member subject to angular displacement, said member being provided along its radius with a pin, a rotatable follower member being provided along its radius with a pin, a pair of crossed levers, said members and said levers having a common pivotal axis, adjacent arms of said levers normally being in engagement with said pins, and spring means connected between the other arms of said levers to urge said arms together.

5. In a transmitting device, a pivoted member subject to angular displacement, a control arm for said member, a pivoted follower for said first member, a control arm for said follower, and a pair of crossed levers normally tensioned to closed position to maintain said arms in alignment, whereby angular displacement of said pivoted member moves said first-mentioned control arm out of alignment with said follower control arm and increases the said normal tension on said levers thereby to drive said follower and its associated control arm about its pivot to a position with said arms in alignment.

EDWARD S. PETERSON.

REFERENCES CITED

The following references are of record in the file of this patent:

UNITED STATES PATENTS

| Number | Name | Date |
|---|---|---|
| 1,391,653 | Meitner | Sept. 20, 1921 |
| 1,258,497 | Straub | Mar. 5, 1918 |
| 469,273 | Robinson | Feb. 23, 1892 |
| 911,354 | Winslow | Feb. 2, 1909 |
| 1,526,538 | Ford | Feb. 17, 1925 |
| 1,391,652 | Meitner | Sept. 20, 1921 |
| 1,507,653 | Zobel | Sept. 9, 1924 |

FOREIGN PATENTS

| Number | Country | Date |
|---|---|---|
| 65,969 | Austria | 1914 |
| 151,050 | Great Britain | Sept. 20, 1920 |